United States Patent
Itoo et al.

(10) Patent No.: US 9,778,087 B2
(45) Date of Patent: Oct. 3, 2017

(54) OIL LEVEL DETECTOR

(71) Applicant: KAWASAKI JUKOGYO KABUSHIKI KAISHA, Hyogo (JP)

(72) Inventors: Seiji Itoo, Akashi (JP); Shinichi Tanaka, Kakogawa (JP); Ayumi Hamada, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 179 days.

(21) Appl. No.: 14/585,580

(22) Filed: Dec. 30, 2014

(65) Prior Publication Data
US 2016/0187178 A1    Jun. 30, 2016

(51) Int. Cl.
     *G01F 23/04*      (2006.01)
     *F01M 11/12*      (2006.01)

(52) U.S. Cl.
     CPC ............. *G01F 23/04* (2013.01); *F01M 11/12* (2013.01)

(58) Field of Classification Search
     CPC ................................. F01M 11/12; G01F 23/04
     USPC ....................... 33/722–730; 73/290 B, 290 R
     See application file for complete search history.

(56) References Cited

U.S. PATENT DOCUMENTS

| | | | | |
|---|---|---|---|---|
| 2,916,308 A | * | 12/1959 | Voldrich et al. | F16L 41/084 285/133.11 |
| 4,425,054 A | * | 1/1984 | Blondy et al. | G01M 3/26 405/195.1 |
| 6,427,427 B1 | * | 8/2002 | Dietz | F01M 11/0408 56/1 |
| 2013/0125809 A1 | * | 5/2013 | Gracyalny et al. | G01F 23/58 116/228 |
| 2013/0305552 A1 | * | 11/2013 | Krishnamurthy et al. | G01F 23/04 33/728 |
| 2015/0285668 A1 | * | 10/2015 | Inokura et al. | G01F 23/04 33/722 |

FOREIGN PATENT DOCUMENTS

| | | | | |
|---|---|---|---|---|
| CN | 202732038 U | * | 2/2013 | ............. F01M 11/12 |
| DE | 102005053813 A1 | * | 5/2007 | ............. F01M 11/12 |
| DE | 102007026369 A1 | * | 12/2008 | ............. F01M 11/04 |
| JP | 3446296 | | 7/2003 | |
| JP | 2007292003 A | * | 11/2007 | ............. F01M 11/12 |
| JP | 2016003632 A | * | 1/2016 | ............. F01M 11/12 |

* cited by examiner

*Primary Examiner* — R. A. Smith
(74) *Attorney, Agent, or Firm* — Wenderoth, Lind & Ponack, L.L.P.

(57) ABSTRACT

An oil level detector configured to detect a level of oil in a case includes: a guide tube inserted to the case; and an oil level gauge inserted to the guide tube to detect the level of the oil in the case. The guide tube includes a main body having a distal end portion and an insert portion inserted to the case, and a branch portion provided between the distal end portion and the insert portion and branching from the main body, and the branch portion is inserted to the case at a position higher than the insert portion.

5 Claims, 8 Drawing Sheets

OIL LEVEL DETECTOR

BACKGROUND OF THE INVENTION

1. Field of the Invention

The present invention relates to an oil level detector configured to detect a level of oil in a case.

2. Description of the Related Art

As disclosed in JP 3446296 B1 or the like, a level of engine oil supplied to an engine of a utility vehicle has been conventionally detected by inserting an oil level gauge having a long bar shape to a guide tube that is inserted to a case such as an oil tank or an oil pan. A seal position of the oil level gauge in the guide tube is identical with an oil detection position.

SUMMARY OF THE INVENTION

When locating the oil level gauge at the seal position to detect an oil level, the oil level gauge is inserted to the guide tube by a large amount and air in the guide tube is thus mixed with the oil in the case. This occasionally causes fluctuation in oil level and deterioration in oil level detection accuracy.

In view of the above, an object of the present invention is to provide an oil level detector that can suppress deterioration in oil level detection accuracy even when an oil level gauge is inserted to a guide tube.

In order to achieve the object mentioned above, according to a first aspect of the present invention, an oil level detector configured to detect a level of oil in a case includes:, a guide tube inserted to the case; and an oil level gauge inserted to the guide tube to detect the level of the oil in the case; wherein the guide tube includes a main body having a distal end portion and an insert portion inserted to the case, and a branch portion provided between the distal end portion and the insert portion and branching from the main body, and the branch portion is inserted to the case at a position higher than the insert portion.

In this configuration, air in the guide tube is fed to the branch portion when the oil level gauge is inserted to the guide tube. The configuration decreases fluctuation in oil level and accordingly suppresses deterioration in oil level detection accuracy.

The oil level detector according to the first aspect of the present invention preferably includes any of the following configurations.

(1) The branch portion is inserted to the case at a position higher than a maximum oil level of the case.

(2) The branch portion has an inner diameter smaller than an inner diameter of the main body, and the branch portion is attached, by welding, to an outer surface of the main body.

(3) The main body includes a first slant portion slanted downward from the distal end portion and a second slant portion extending from the first slant portion and slanted downward at a slant angle larger than that of the first slant portion, and the branch portion branches from a lower side of the main body.

(4) The branch portion is lowered as extending from a position branching from the main body toward a position inserted to the case, and the branch portion has a bent portion having a bending angle of 90 degrees or less.

In the configuration (1), the branch portion is inserted to the case at a position higher than the maximum oil level of the case. Air in the guide tube fed to the branch portion is thus prevented from affecting the oil level of the case.

In the configuration (2), the inner diameter of the branch portion is smaller than the inner diameter of the main body and the branch portion is attached by welding to the outer surface of the main body. The oil level gauge inserted to the guide tube is thus prevented from being inserted to the branch portion.

In the configuration (3), the branch portion branches from the main body at a side opposite to a side along the oil level gauge. The oil level gauge inserted to the guide tube is thus prevented from being inserted to the branch portion.

The branch portion has the bent portion in the configuration (4). Oil in the case is thus prevented from flowing reversely to the main body even when the case is slanted. When the case is slanted and then returns to be horizontal, oil at the branch portion thus easily returns to the case because the branch portion is lowered as extending toward the case.

According to a second aspect of the present invention, an oil level detector configured to detect a level of oil in a case includes:

a guide tube inserted to the case; and an oil level gauge inserted to the guide tube to detect the level of the oil in the case; wherein the oil level gauge includes:

a saber portion inserted to the guide tube;

a gauge portion coupled to a distal end of the saber portion and at least partially introduced to an oil level;

a seal portion coupled to a proximal end of the saber portion and sealing the guide tube and the oil level gauge; and a stopper member fixing the seal portion to the guide tube to locate the gauge portion at an oil detection position.

This configuration includes the stopper member that distinguishes between the seal position and the oil detection position of the oil level gauge and locates the oil level gauge at the detection position. The configuration decreases fluctuation in oil level and accordingly suppresses deterioration in oil level detection accuracy.

The oil level detector according to the second aspect of the present invention preferably includes any of the following configurations.

(5) The seal portion is shiftable between a seal position and a detection position, the seal portion located at the seal position is engaged with the stopper member and seals the guide tube and the oil level gauge, and the seal portion located at the detection position is in contact with the stopper member and locates the gauge portion at the oil detection position.

(6) In the configuration (5), the seal portion has a center axis, and the seal portion is turned about the center axis to be shiftable between the seal position and the detection position.

(7) The seal portion has a cutout to be engaged with the stopper member.

(8) In the configuration (7), the seal portion has a shaft portion inserted to the guide tube to form sealing with the oil level gauge, and a head portion positioning the guide tube and the oil level gauge, and the cutout is provided at the head portion.

(9) The guide tube is inserted to a side surface of the case.

In the configuration (5), the seal portion is shiftable between the seal position and the detection position by engagement or contact with the stopper member. The seal portion is thus shifted easily.

In the configuration (6), the seal portion is shiftable between the seal position and the detection position by being turned. The seal portion is thus shifted easily.

The configuration (7) achieves easy provision of the seal portion engaged with the stopper member.

The configuration (8) achieves easy provision of the cutout engaged with the stopper member.

In the configuration (9), when the oil level gauge is inserted to the guide tube that is inserted to the side surface of the case, the oil level of the case is likely to fluctuate. Even in such a configuration, fluctuation in oil level can be decreased by provision of the stopper member that locates the oil level gauge at the detection position. The configuration accordingly suppresses deterioration in oil level detection accuracy.

In summary, the present invention provides an oil level detector that can suppress deterioration in oil level detection accuracy even when an oil level gauge is inserted to a guide tube.

DETAILED DESCRIPTION OF THE INVENTION

First Embodiment

[Entire Structure of Vehicle]

Figure 1:
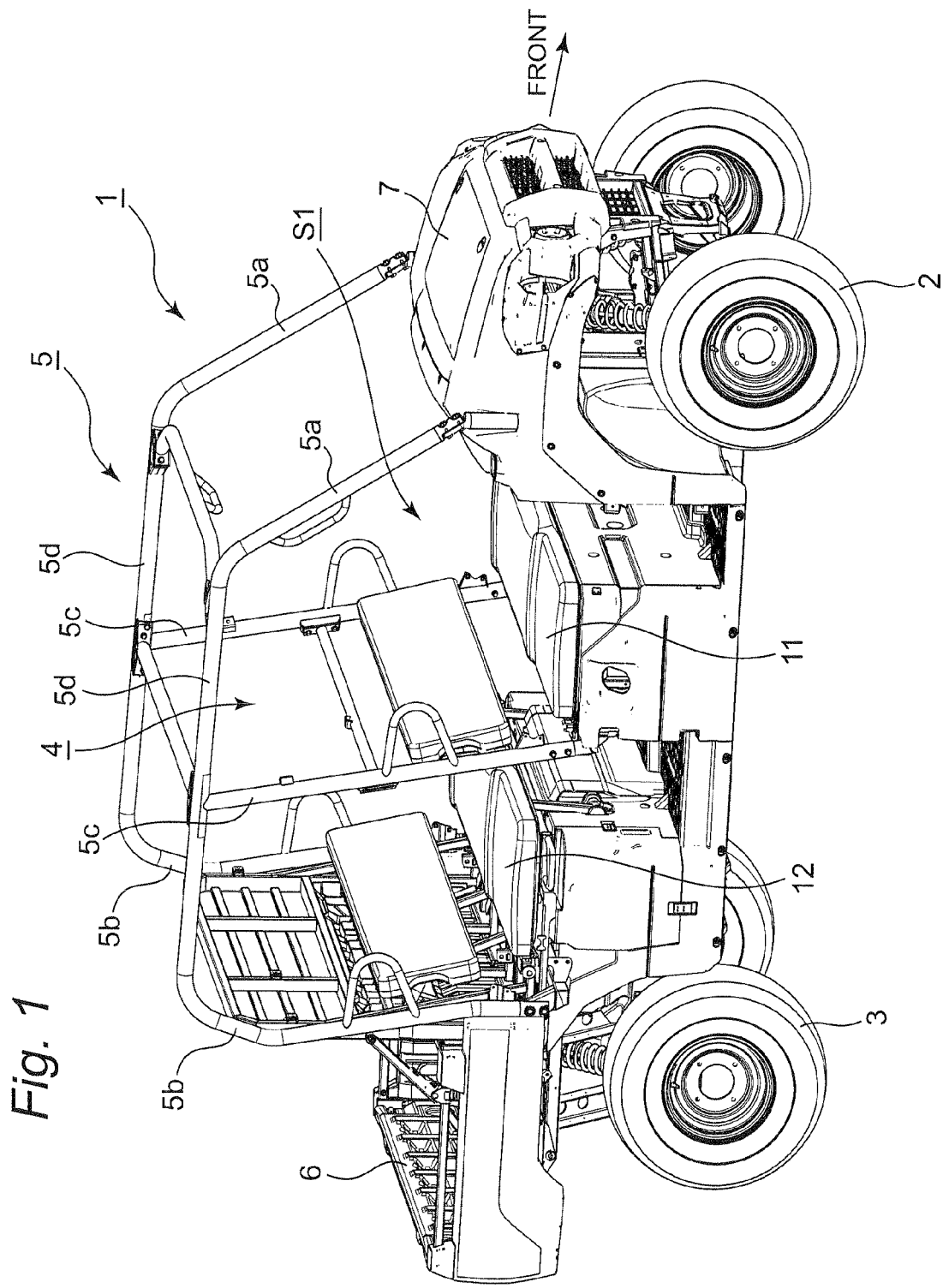
FIG. 1 is a perspective view of a utility vehicle including an oil level detector according to a first embodiment of the present invention.
Figure 2:
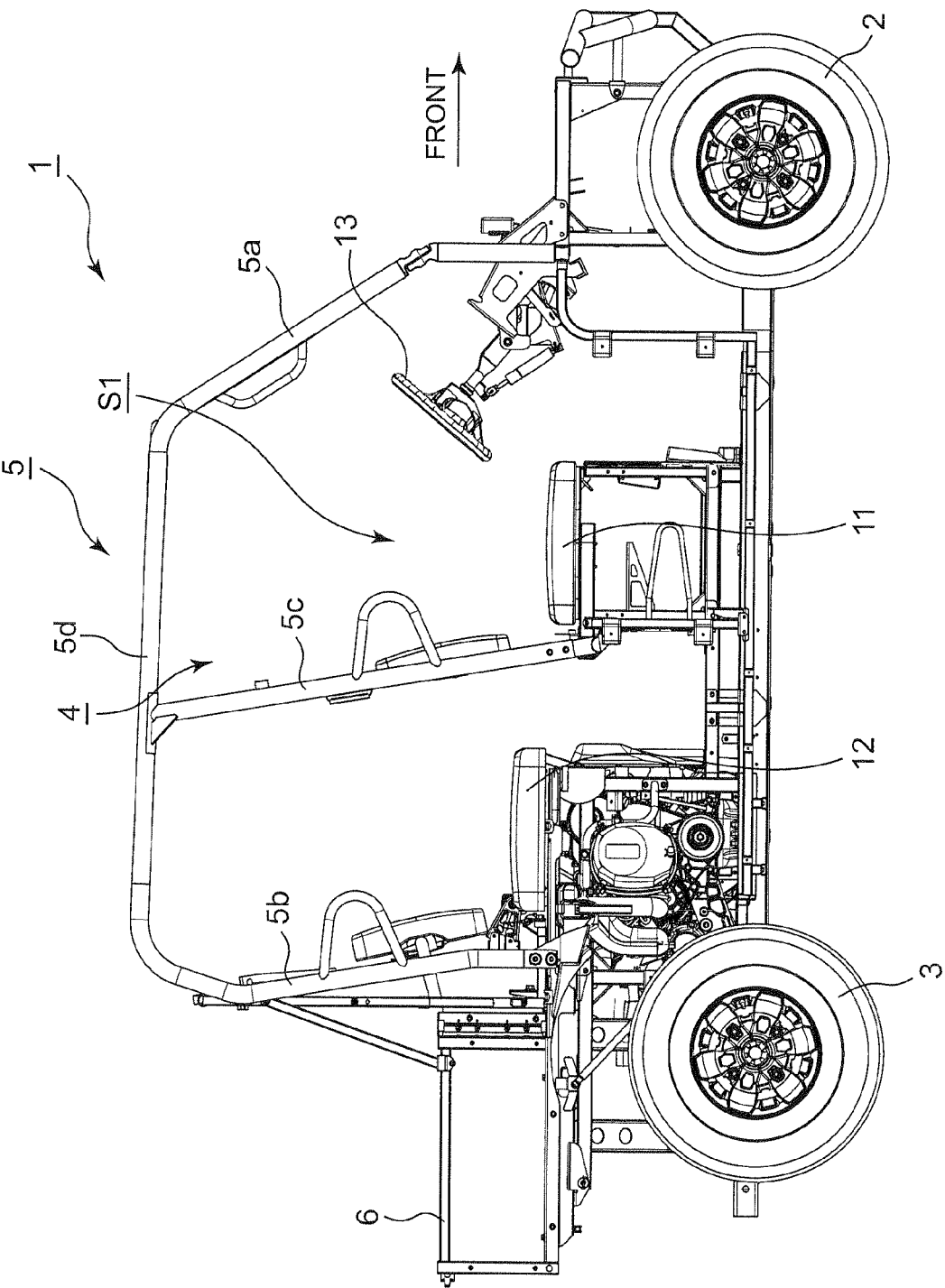
FIG. 2 is a right side view of the utility vehicle depicted in FIG. 1.

FIG. 1 is a perspective view of a utility vehicle including an oil level detector according to the first embodiment of the present invention. Assume that the concept of directions according to the present embodiment matches the concept of directions viewed from a driver of the utility vehicle. FIG. 2 is a right side view of the utility vehicle depicted in FIG. 1.

As depicted in FIGS. 1 and 2, a utility vehicle 1 includes a pair of left and right front wheels 2 at a vehicle front portion, a pair of left and right rear wheels 3 at a vehicle rear portion, and a riding space (cabin) 4 between the front wheels 2 and the rear wheels 3. The riding space 4 is surrounded with a R.O.P.S. 5. The R.O.P.S. is an abbreviation for a rollover protective structure. The R.O.P.S. 5 includes a pair of left and right front vertical members 5a, a pair of left and right rear vertical members 5b, a pair of left and right intermediate vertical members 5c provided between the front vertical members 5a and the rear vertical members 5b, and a plurality of upper end beam members 5d coupling the upper ends of the vertical members 5a, 5b, and 5c. These members are part of a chassis frame. The riding space 4 is provided therebehind with a cargo bed 6, and is provided thereahead with a bonnet 7. The front half of the riding space 4 is provided with a front bench seat 11 and the rear half of the riding space 4 is provided with a rear bench seat 12. The front seat 11 has a left seat region Si serving as a driver's seat. The left seat region S1 is provided thereahead with an operation unit including a steering wheel 13 and the like.

Figure 3:
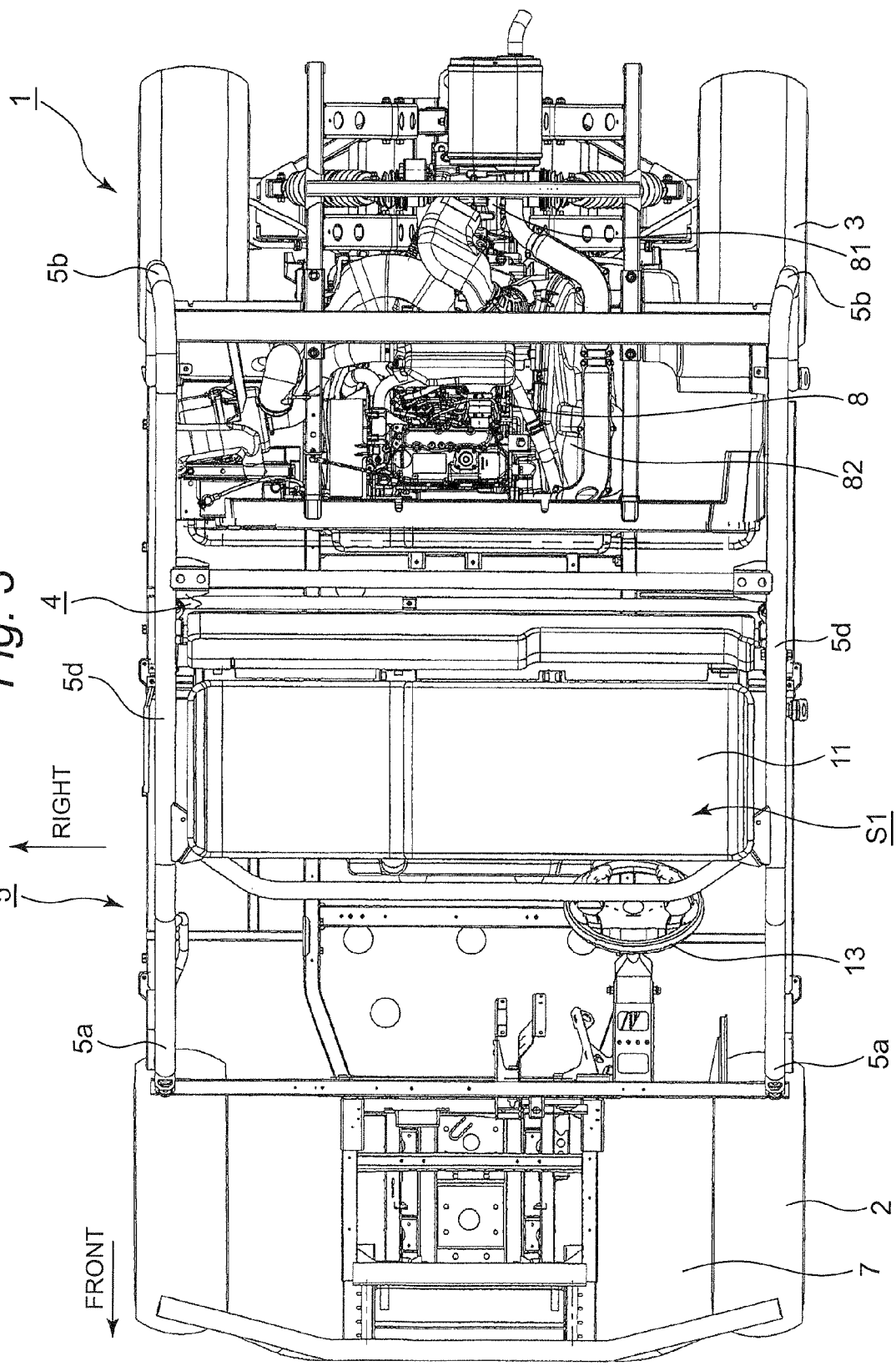
FIG. 3 is a top view of the utility vehicle depicted in FIG. 1.

FIG. 3 is a top view of the utility vehicle depicted in FIG. 1. FIG. 3 depicts a state where the rear seat 12 and the cargo bed 6 are removed. As depicted in FIGS. 2 and 3, the rear seat 12 is provided therebelow with an engine 8. The engine 8 is provided therebehind with a transmission 81 configured to convert driving power from the engine 8 and transmit to the wheels. The engine 8 and the transmission 81 are provided separately from each other. A belt converter 82 is attached to the left side surface of the engine 8 and the left side surface of the transmission 81, so that driving power of the engine 8 is transmitted to the transmission 81. The belt converter 82 is a V-belt type continuously variable transmission, and is automatically varied in speed in accordance with rotational speed of the engine 8 and increase or decrease in load on the wheels.

[Structure of Oil Level Detector]

Figure 4:
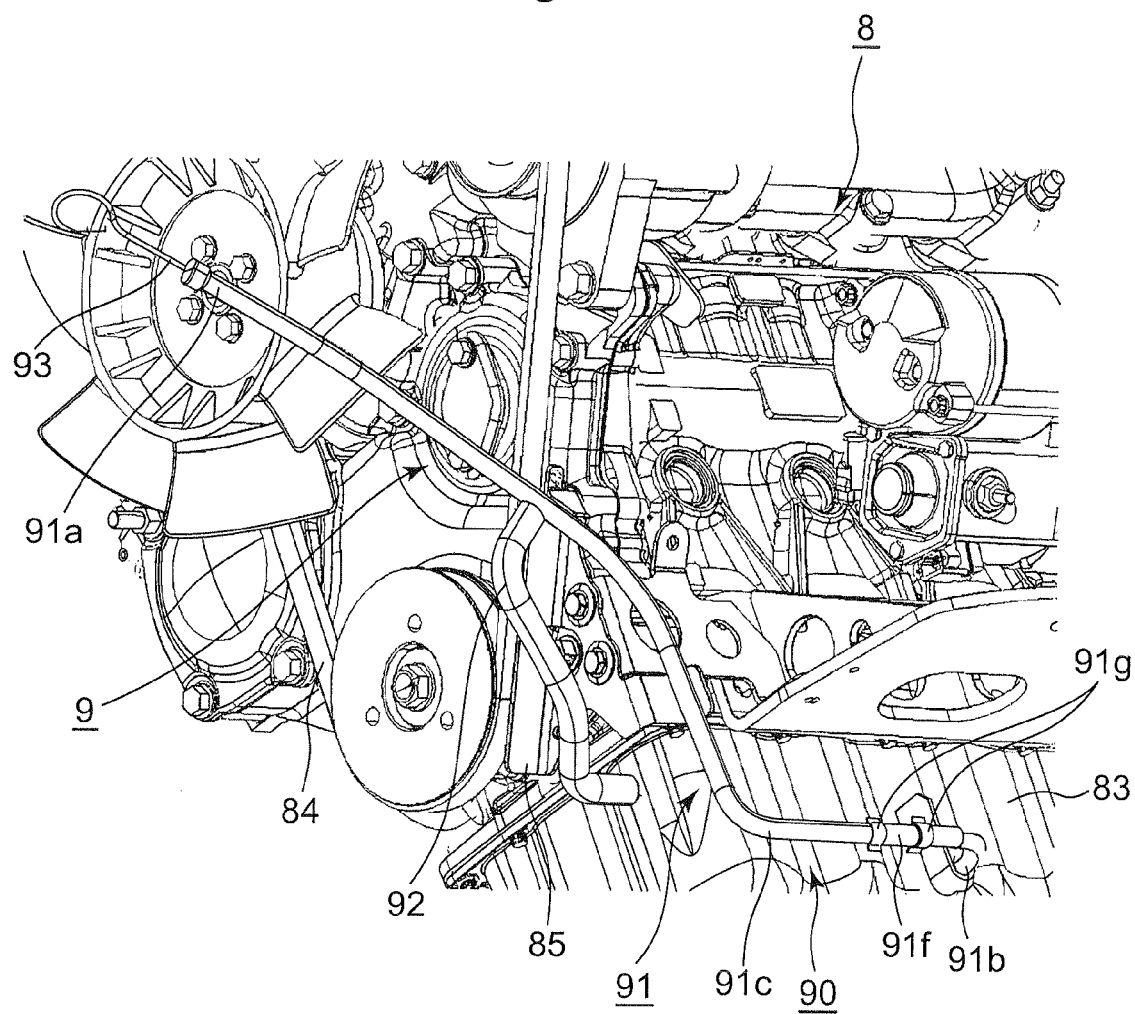
FIG. 4 is a perspective view of the oil level detector.

FIG. 4 is a perspective view of an oil level detector 9. As depicted in FIG. 4, the oil level detector 9 is configured to detect a level of oil in an oil case 83 provided at the bottom of the engine 8. The oil level detector 9 includes a guide tube 90 inserted to the oil case 83 and an oil level gauge 93 inserted to the guide tube 90 to detect a level of oil in the oil case. The guide tube 90 includes a main body 91 and a branch portion 92. The main body 91 has a distal end portion 91a, an insert portion 91b inserted to the oil case 83, and a center portion 91c connected to the distal end portion 91a and the insert portion 91b. The branch portion 92 is located between the distal end portion 91a and the insert portion 91b and branches from the main body 91. The distal end portion 91a and the center portion 91c are provided integrally with each other, and are made of metal such as iron. The insert portion 91b is provided separately from the distal end portion 91a and the center portion 91c, is made of metal such as iron, and is inserted to a side surface of the oil case 83. The center portion 91c and the insert portion 91b are connected to each other via a rubber tube 91f. The rubber tube 91f is clamped to the center portion 91c and the insert portion 91b by steel bands 91g, respectively.

Figure 5:
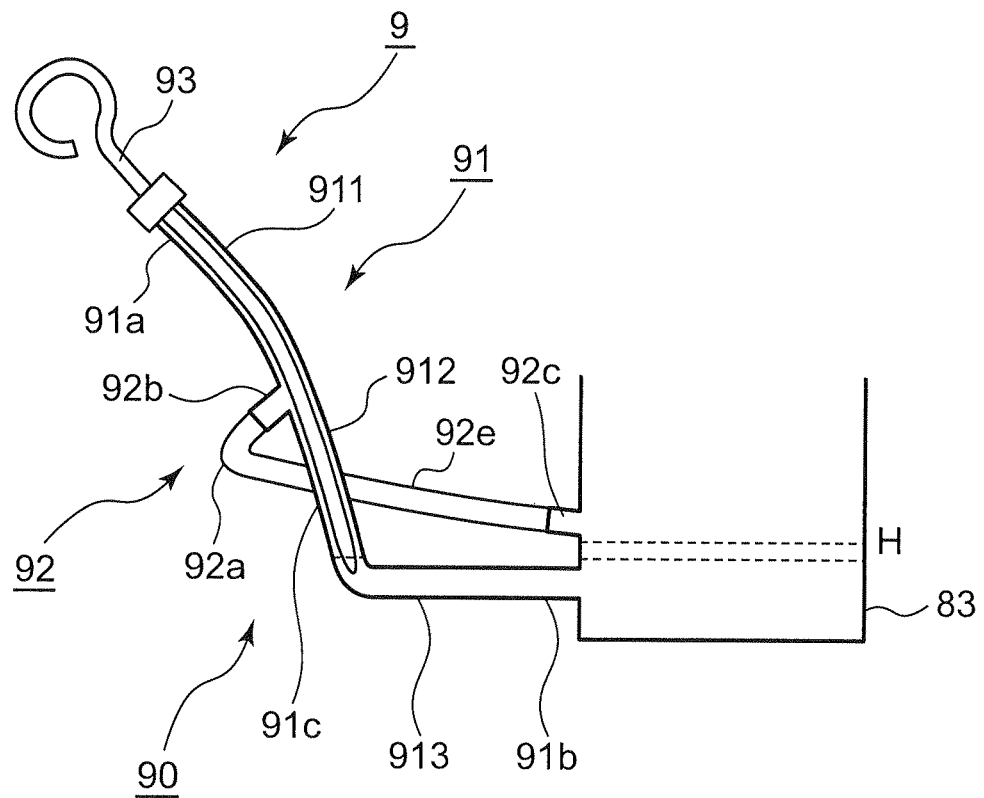
FIG. 5 is a schematic view of the oil level detector.

FIG. 5 is a schematic view of the oil level detector 9. The branch portion 92 is inserted to the oil case 83 at a position higher than the insert portion 91b. The branch portion 92 is inserted to the oil case 83 at a position higher than a maximum oil level H of the oil case 83, that is, the highest level of oil supplied to the oil case 83.

The center portion 91c in the main body 91 includes a first slant portion 911 slanted downward from the distal end portion 91a, a second slant portion 912 extending from the first slant portion 911 and slanted downward at a slant angle larger than that of the first slant portion 911, and a horizontal portion 913 extending from the second slant portion 912 substantially horizontally. The branch portion 92 branches from the lower side of the center portion 91c of the main body 91 between the first slant portion 911 and the second slant portion 912. The distal end portion of the oil level gauge 93 inserted to the guide tube 90 is located in the vicinity of the boundary between the second slant portion 912 and the horizontal portion 913.

The branch portion 92 is lowered as extending from the position branching from the main body 91 toward the position inserted to the oil case 83. The branch portion 92 has a bent portion 92a having a bending angle of 90 degrees or less.

The branch portion 92 has a main body port 92b, a case port 92c, and a tube portion 92e coupling the main body port 92b and the case port 92c. The main body port 92b and the case port 92c are made of metal such as iron. The tube portion 92e is made of heat-resistant rubber such as acrylic rubber. The main body 91 is made of metal such as iron.

Figure 6:
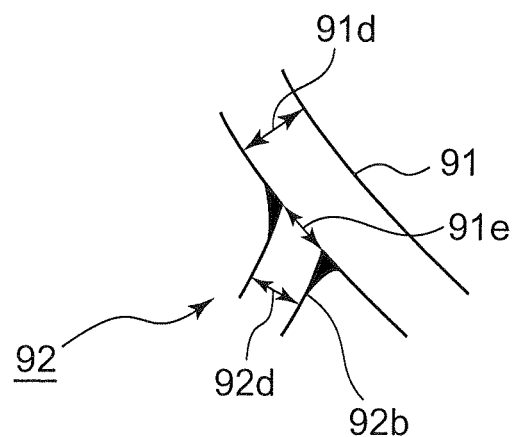
FIG. 6 is an enlarged view of a coupling portion between a main body and a branch portion.

FIG. 6 is an enlarged view of a coupling portion between the main body 91 and the branch portion 92. As depicted in FIG. 6, the branch portion 92 has an inner diameter 92d that is smaller than an inner diameter 91d of the main body 91. The main body port 92b of the branch portion 92 is attached by braze welding to the outer surface of the main body 91. The main body 91 is provided, at the coupling portion with the branch portion 92, with an opening 91e that has an outer diameter smaller than the inner diameter 92d of the branch portion 92.

The tube portion 92e of the branch portion 92 is made of heat-resistant rubber. A guard member 85 is provided between a power transmission belt 84 of the engine 8 and the branch portion 92 to prevent, even when the power transmission belt 84 is cut off, disengagement or damage of the tube portion 92e due to contact between the power transmission belt 84 and the tube portion 92e. The guard member 85 is attached to an engine case.

The oil level detector 9 thus configured can achieve the following effects.

(1) The guide tube 90 includes the main body 91 and the branch portion 92. The main body 91 has the distal end portion 91a and the insert portion 91b inserted to the oil case 83. The branch portion 92 is located between the distal end portion 91a and the insert portion 91b and branches from the main body 91. The branch portion 92 is inserted to the oil case 83 at a position higher than the insert portion 91b. Air in the guide tube 90 is thus fed to the branch portion 92 when the oil level gauge 93 is inserted to the guide tube 90. This configuration decreases fluctuation in oil level and accordingly suppresses deterioration in oil level detection accuracy.

(2) The branch portion 92 is inserted to the oil case 83 at a position higher than the maximum oil level H of the oil case 83. Air in the guide tube 90 fed to the branch portion 92, is thus prevented from affecting the oil level of the oil case 83.

(3) The inner diameter 92d of the branch portion 92 is smaller than the inner diameter 91d of the main body 91, and the branch portion 92 is attached by welding to the outer surface of the main body 91. The oil level gauge 93 inserted to the guide tube 90 is thus prevented from being inserted to the branch portion 92. The outer diameter of the opening 91e in the main body 91 at the coupling portion with the branch portion 92 is smaller than the inner diameter 92d of the branch portion 92. The oil level gauge 93 inserted to the guide tube 90 is thus further prevented from being inserted to the branch portion.

(4) The center portion 91c of the main body 91 includes the first slant portion 911 slanted downward from the distal end portion 91a, and the second slant portion 912 extending from the first slant portion 911 and slanted downward at a slant angle larger than that of the first slant portion 911. The oil level gauge 93 is thus inserted so as to be along the upper side of the main body 91. The branch portion 92 branches from the lower side of the center portion 91c of the main body 91. The oil level gauge 93 inserted to the guide tube 90 is thus prevented from being inserted to the branch portion 92.

(5) The branch portion 92 has the bent portion 92a, so that oil in the oil case 83 is prevented from flowing reversely to the main body 91 even when the vehicle is slanted and the oil case 83 is accordingly slanted. When the oil case 83 is slanted and then returns to be horizontal, oil at the branch portion 92 easily returns to the oil case 83 because the branch portion 92 is lowered as extending toward the oil case 83.

(6) The branch portion 92 has the tube portion 92e made of heat-resistant rubber. The tube portion 92e can be easily attached to the main body port 92b and the case port 92c. The tube portion 92e has relatively wider route flexibility as compared to the branch portion 92 made of metal.

In the embodiment described above, the center portion 91c of the main body 91 has the two slant portions, namely, the first slant portion 911 and the second slant portion 912. The number of the slant portions is not limited to two, and the center portion 91c can have two or more slant portions. More specifically, preferably, the main body 91 is lowered as extending toward the oil case 83 and the oil level gauge 93 is inserted so as to be along the upper side of the main body 91. The main body 91 is preferred not to have a bent portion at 90 degrees or less, in view of easy insertion of the oil level gauge 93.

The tube portion 92e of the branch portion 92 is made of heat-resistant rubber in the above embodiment. The tube portion 92e can be alternatively made of metal such as iron. When the tube portion 92e is made of metal, there is no need to provide the guard member 85.

Second Embodiment

Figure 7:
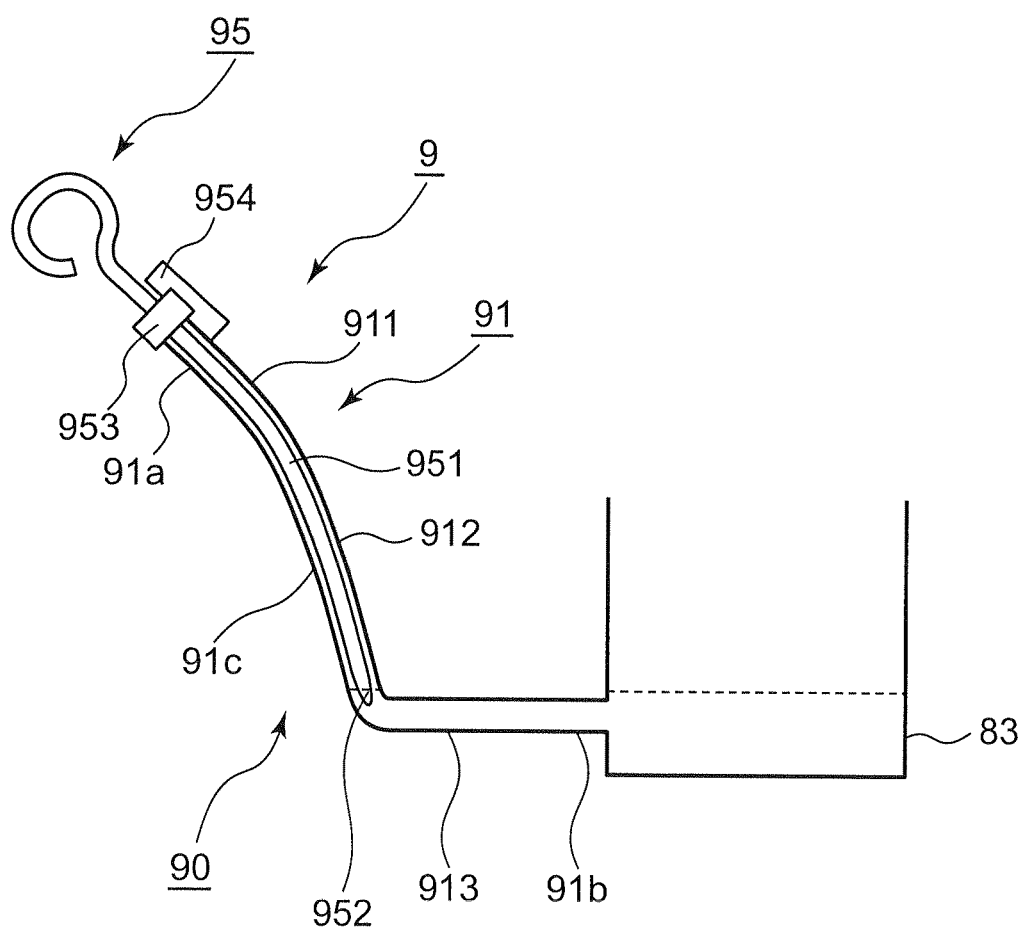
FIG. 7 is a perspective view of an oil level detector according to a second embodiment.

FIG. 7 is a perspective view of an oil level detector according to the second embodiment. In the first embodiment, the guide tube 90 has the branch portion 92 branching from the main body 91. The second embodiment is different from the first embodiment in that the branch portion is not provided but the oil level gauge has a stopper member that fixes, to the guide tube, a seal portion sealing the guide tube and the oil level gauge. The second embodiment is same as the first embodiment in the other configurations. In the description of the second embodiment, the components and portions same as those of the first embodiment are denoted by the same reference signs, and will not be detailed repeatedly.

An oil level gauge 95 includes a saber portion 951 inserted to the guide tube 90, a gauge portion 952 coupled to the distal end of the saber portion 951 and at least partially introduced to an oil level, a seal portion 953 coupled to the proximal end of the saber portion 951 and sealing the guide tube 90 and the oil level gauge 95, and a stopper member 954 fixing the seal portion 953 to the guide tube 90 so as to locate the gauge portion 952 at an oil detection position.

The seal portion 953 is shiftable between a seal position and the detection position. The seal portion 953 located at the seal position is engaged with the stopper member 954 and seals the guide tube 90 and the oil level gauge 95. The seal portion 953 located at the detection position is in contact with the stopper member 954 and locates the gauge portion 952 at the oil detection position.

Figure 8:
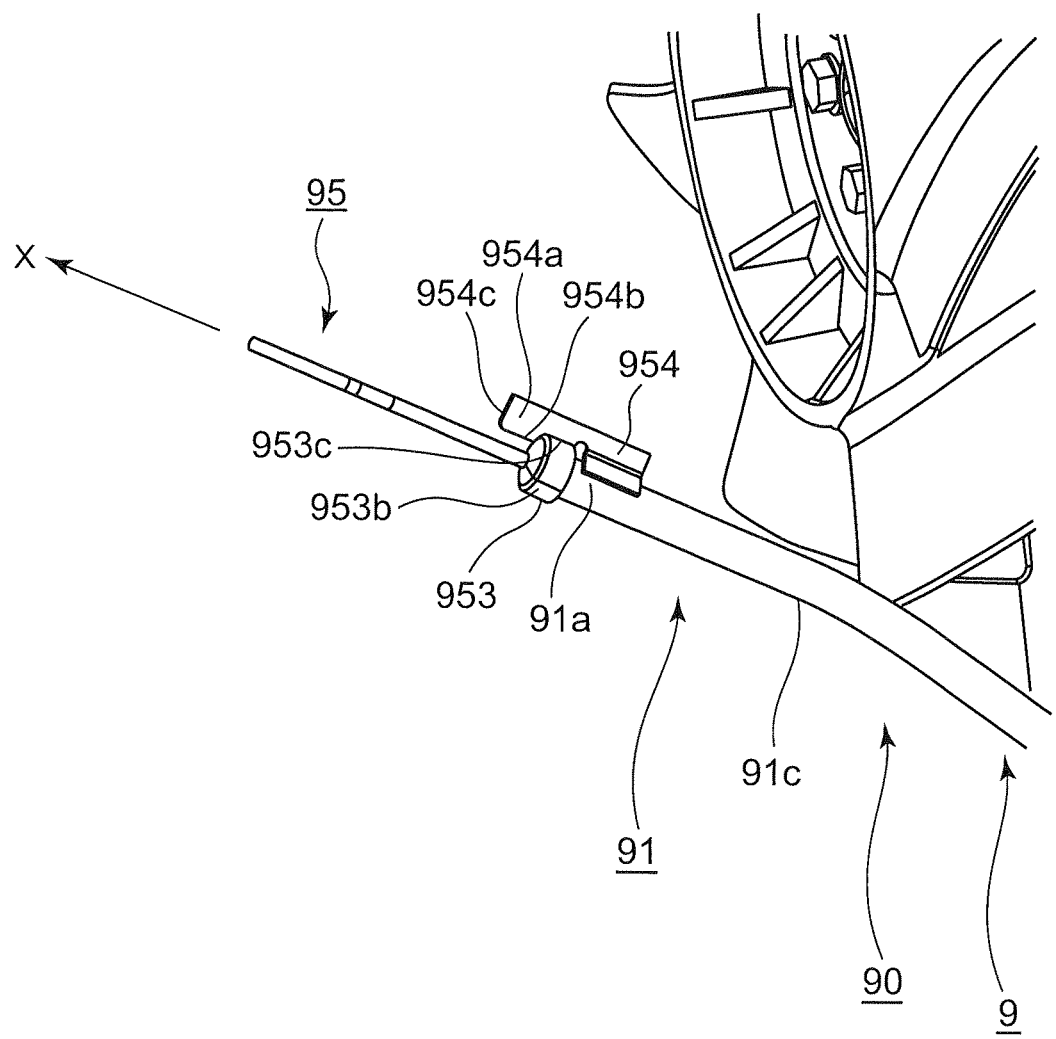
FIG. 8 is a perspective view of a stopper member located at a seal position.
Figure 9:
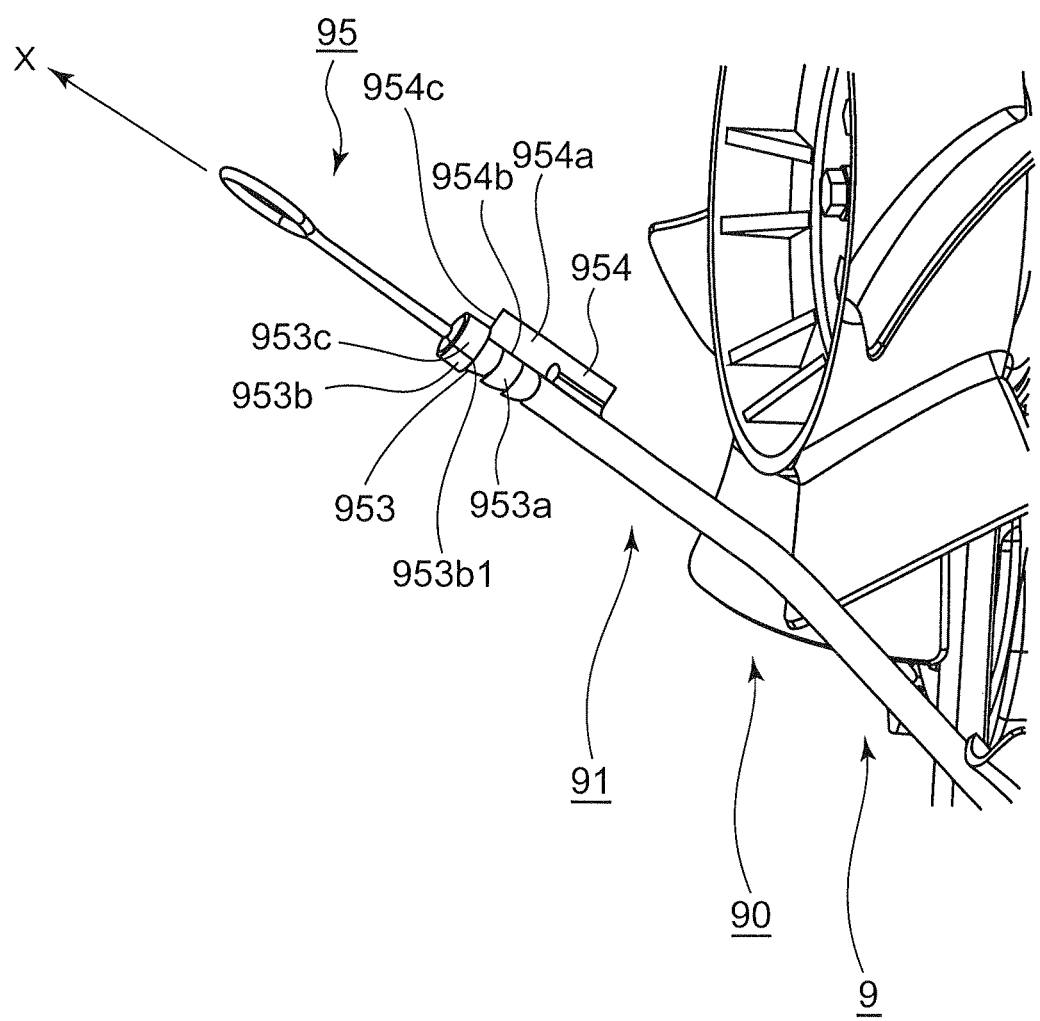
FIG. 9 is a perspective view of the stopper member located at a detection position.

Shift of the seal portion 953 is described in detail below. FIG. 8 is a perspective view of the stopper member 954 located at the seal position. FIG. 9 is a perspective view of the stopper member 954 located at the detection position. As depicted in FIGS. 8 and 9, the stopper member 954 is attached to the distal end portion 91a of the guide tube 90, and has a projection 954a projecting from the distal end portion 91a of the guide tube 90 along center axes (X) of the guide tube 90 and the seal portion 953.

The seal portion 953 has a shaft portion 953a inserted to the guide tube 90 to form sealing with the oil level gauge, and a head portion 953b positioning the guide tube 90 and the oil level gauge 95. The head portion 953b has an outer diameter larger than an outer diameter of the guide tube 90, whereas the shaft portion 953a has an outer diameter smaller than an inner diameter of the guide tube 90. The projection 954a of the stopper member 954 has a plate shape. The projection 954a has an end surface 954b extending along the axis of the guide tube and made in contact with the shaft portion 953a when the stopper member 954 is located at the detection position. The head portion 953b has a side surface provided with a cutout 953c that extends in the X direction and is engaged with the stopper member 954. The projection 954a of the stopper member 954 located at the seal position is engaged with the cutout 953c.

The seal portion 953 is turnable about the center axis X relatively to the guide tube 90. When the seal portion 953 is turned about the center axis X, the seal portion 953 is shiftable between the seal position as depicted in FIG. 8 and the detection position as depicted in FIG. 9. At the seal position, the stopper member 954 is engaged with the cutout 953c in the head portion 953b of the seal portion 953, and the seal portion 953 seals the guide tube 90 and the oil level gauge 95. At the detection position, the stopper member 954 is not engaged with the cutout 953c in the head portion 953b, a distal end 954c of the stopper member 954 is in contact with a shaft portion end surface 953b1 of the head portion 953b, and the gauge portion 952 is located at the oil detection position. The oil detection position of the gauge portion 952 is made higher than the position of the gauge portion 952 in the case where the seal portion 953 is located at the seal position, by extracting the oil level gauge 95 in the X direction from the guide tube 90.

The oil level detector thus configured can achieve the following effects.

(1) This configuration includes the stopper member 954 that distinguishes between the seal position and the oil detection position of the oil level gauge 95 and locates the oil level gauge 95 at the detection position. The oil level gauge 95 is not inserted to the seal position upon detection of an oil level. The configuration thus decreases fluctuation in oil level. Suppressed accordingly is deterioration in oil level detection accuracy.

(2) The seal portion 953 is shiftable between the seal position and the detection position by engagement or contact with the stopper member 954. The seal portion 953 is thus shifted easily.

(3) The seal portion 953 is shiftable between the seal position and the detection position by being turned about the center axis X. The seal portion 953 is thus shifted easily.

(4) The seal portion 953 is provided with the cutout 953c to be engaged with the stopper member 954. The seal portion 953 can be easily formed so as to be engaged with the stopper member 954.

(5) The seal portion 953 has the shaft portion 953a inserted to the guide tube 90 to form sealing with the oil level gauge, and the head portion 953b positioning the guide tube 90 and the oil level gauge 95 and provided with the cutout 953c. The cutout 953c to be engaged with the stopper member 954 can be thus formed easily.

(6) When the oil level gauge 95 is inserted to the guide tube 90 that is inserted to the side surface of the oil case 83, the oil level of the oil case 83 is likely to fluctuate. Even in such a configuration, fluctuation in oil level can be decreased by provision of the stopper member 954 that locates the oil level gauge 95 at the oil detection position. This configuration accordingly suppresses deterioration in oil level detection accuracy.

In the above embodiment, the seal portion 953 is located at the seal position by engaging the stopper member 954 with the cutout 953c in the head portion 953b of the seal portion 953. The present invention is not limited to this in terms of the method of locating the seal portion 953 at the seal position. The present invention has only to include a configuration avoiding contact between the distal end 954c of the stopper member 954 and the shaft portion end surface 953b1 of the head portion 953b of the seal portion 953. For example, the projection 954a of the stopper member 954 can be an elastic member. Contact between the projection 954a and the head portion 953b can be avoided when the projection 954a is deformed to be distant from the seal portion 953.

In the above embodiment, the gauge portion 952 is located at the oil detection position by contact between the distal end 954c of the stopper member 954 and the shaft portion end surface 953b1 of the head portion 953b. The present invention is not limited to this in terms of the method of locating the gauge portion 952 at the oil detection position. The oil level gauge 95 has only to be extracted by a constant amount in the X direction from the guide tube 90 and be fixed.

The head portion 953b of the seal portion 953 is provided with the single cutout 953c in the above embodiment. The present invention is not limited to the single cutout 953c but a plurality of cutouts can be provided.

The oil level detector 9 for the oil case 83 of the engine 8 is exemplified in the first and second embodiments. An oil level detection mechanism according to the present invention is not limited to an oil level detector for an oil case of an engine. The present invention is applicable to an oil level detector that is provided in a transmission or in a gear chamber in a vehicle.

The present invention can be modified or changed in various manners without departing from the spirit and scope of the present invention recited in the following patent claims.

The invention claimed is:

1. An oil level detector configured to detect a level of oil in a case, the oil level detector comprising:
   a guide tube connected to the case; and
   an oil level gauge inserted in the guide tube to detect the level of the oil in the case; wherein
   the oil level gauge includes:
   a saber portion inserted in the guide tube;
   a gauge portion coupled to a distal end of the saber portion and at least partially introduced to an oil level;
   a seal portion coupled to a proximal end of the saber portion and sealing the guide tube and the oil level gauge; and
   a stopper member fixing the seal portion to the guide tube to locate the gauge portion at an oil detection position, wherein the seal portion has a cutout to be engaged with the stopper member.

2. The oil level detector according to claim 1, wherein the seal portion is shiftable between a seal position and a detection position, the seal portion located at the seal position is engaged with the stopper member and seals the guide tube and the oil level gauge, and the seal portion located at the detection position is in contact with the stopper member and locates the gauge portion at the oil detection position.

3. The oil level detector according to claim 2, wherein the seal portion has a center axis, and the seal portion is turned about the center axis to be shiftable between the seal position and the detection position.

4. The oil level detector according to claim 1, wherein the seal portion has a shaft portion inserted in the guide tube to form a seal with the oil level gauge, and a head portion positioning the guide tube and the oil level gauge, and the cutout is provided at the head portion.

5. The oil level detector according to claim 1, wherein the guide tube is connected to a side surface of the case.

* * * * *